(No Model.)

L. E. WILLEY.
BAKE PAN.

No. 545,216. Patented Aug. 27, 1895.

WITNESSES
Franck L. Ourand.
Charles H. Rood.

INVENTOR
Leonard E. Willey
By Wm H. Bates, Attorney

UNITED STATES PATENT OFFICE.

LEONARD E. WILLEY, OF BARRE, VERMONT.

BAKE-PAN.

SPECIFICATION forming part of Letters Patent No. 545,216, dated August 27, 1895.

Application filed November 7, 1894. Renewed July 31, 1895. Serial No. 557,771. (No model.)

*To all whom it may concern:*

Be it known that I, LEONARD E. WILLEY, a citizen of the United States, residing at Barre, in the county of Washington and State of Vermont, have invented certain new and useful Improvements in Bake-Pans; and I do hereby declare the following to be a full, clear, and exact description of the invention, such as will enable others skilled in the art to which it appertains to make and use the same.

My invention has relation to improvements in baking-pans; and the object is to construct a baking-pan made of a single body-piece having sides and ends which will automatically loosen or break away from the baked contents and having a loose bottom plate.

The invention consists in the particular and improved constructions and combinations, as hereinafter specified, and pointed out in the claim.

Figure 1:
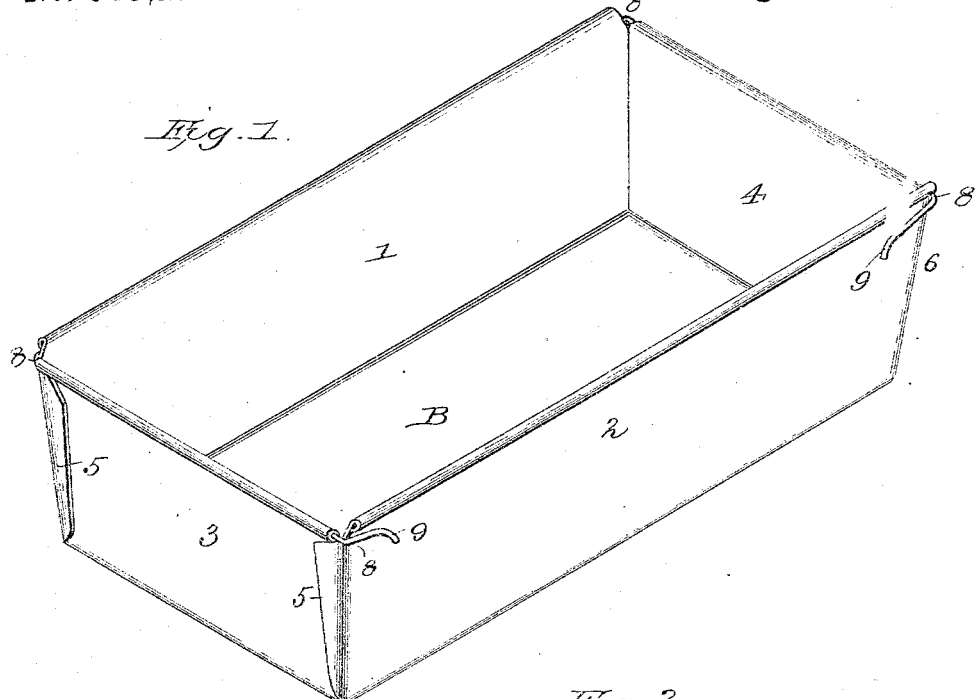
Figure 2:
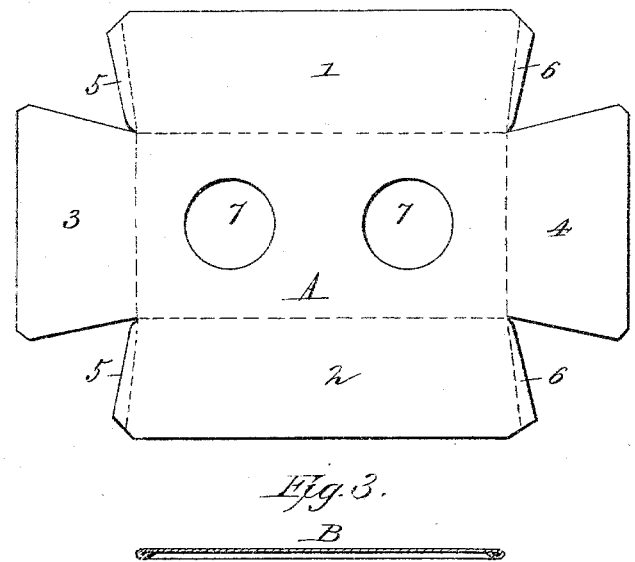
Figure 3:

In the accompanying drawings, Figure 1 is a perspective of the pan closed and as ready for use. Fig. 2 is a detail of the blank from which the pan is made, showing the finger-apertures in the bottom. Fig. 3 is a view of the removable bottom on which the contents of the pan rest.

A designates the blank, consisting of a single piece of suitable sheet metal having side pieces 1 2, constituting the sides of the pan, and end pieces 3 4 to form the ends of the pan, which side and end pieces are separated at the corners of the pan. The side pieces 1 2 are formed with end flanges 5 6, struck at right angles to the face of the metal to lap over and hold the end pieces from breaking away from the contents and to afford stays when the clamps are in position of holding. The sides and ends are turned up on the dotted lines, as indicated in the drawings, and when they are thus turned up the natural resiliency of the metal tends to throw them in the direction from which they have been bent, or outward from the positions from which they may be locked, and by this force they naturally break away from the baked contents when the clamps are released. In the bottom is made one or more apertures 7, which afford means to reach the removable bottom, and thus push the loaf or other baked contents from the pan. The removable bottom B is fitted to lie on and over the bottom of the pan, and on this bottom B the contents are placed. In the edge of each end piece is beaded a wire bail 8, so as to be readily and conveniently turned in the bead, and having the ends 9 turned down, so that they may be turned to lie against the sides of the pan and hold the sides and the ends securely in the desired position for use in baking.

The use of the pan is clearly suggested and indicated in the description, but is briefly restated as follows: The pan being in the clamped condition as shown in Fig. 1 is ready for use when the loose bottom is arranged therein. Then when the baking has been accomplished the clamps are turned away from the sides, which permits the sides and ends to break away from the loaf or cake, and then by pressing up on the loose bottom plate the contents are moved out of the pan.

What I claim is—

A bake-pan formed of a single sheet of metal having its sides and ends integral with the bottom and separated at the corners and flanges 5, 6, at the union of the sides to lap the end pieces and hold them in position and apertures in the bottom, the said sides and ends being adapted to spring outward from the positions in which they may be locked, wire-bails journaled in the upper edges of the end pieces and formed with turned ends 9 adapted to be against the sides and lock the sides and ends in position, and the removable bottom B all constructed, arranged and combined as specified.

In testimony whereof I affix my signature in presence of two witnesses.

LEONARD E. WILLEY.

Witnesses:
E. C. FRENCH,
W. W. LAPOINT.